United States Patent
Kim et al.

(10) Patent No.: US 10,062,360 B2
(45) Date of Patent: Aug. 28, 2018

(54) METHOD OF DRIVING 3D SHUTTER GLASSESES (SPECTACLES), A SHUTTER SPECTACLES APPARATUS FOR PERFORMING THE METHOD AND DISPLAY APPARATUS HAVING THE SHUTTER SPECTACLES APPARATUS

(71) Applicant: Samsung Display Co., LTD., Yongin, Gyeonggi-Do (KR)

(72) Inventors: Bo-Ram Kim, Seoul (KR); Jae-Ho Choi, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 852 days.

(21) Appl. No.: 13/749,966

(22) Filed: Jan. 25, 2013

(65) Prior Publication Data

US 2013/0286057 A1 Oct. 31, 2013

(30) Foreign Application Priority Data

Apr. 26, 2012 (KR) .................. 10-2012-0043576

(51) Int. Cl.
G09G 5/12 (2006.01)
G09G 3/34 (2006.01)
(Continued)

(52) U.S. Cl.
CPC .............. G09G 5/12 (2013.01); G09G 3/003 (2013.01); G09G 3/3406 (2013.01);
(Continued)

(58) Field of Classification Search
CPC ......... G09G 3/3406; G09G 2310/0237; G09G 2360/144; G09G 2360/16; H04N 13/0438; H04N 2213/008
See application file for complete search history.

(56) References Cited

U.S. PATENT DOCUMENTS

2010/0289883 A1* 11/2010 Goris ................. G09G 3/003
 348/56
2010/0309297 A1* 12/2010 Nakagawa ......... G02B 27/2264
 348/56

(Continued)

FOREIGN PATENT DOCUMENTS

JP 2011-041035 2/2011
JP 2011-252943 12/2011

OTHER PUBLICATIONS https://web.archive.org/web/20101231050616/http://www.pacificdisplay.com/lcd_backlights.htm; section "PWM-LED Backlight Driving Method"; accessed on Sep. 1, 2015.*

*Primary Examiner* — Mark Edwards
(74) *Attorney, Agent, or Firm* — Innovation Counsel LLP

(57) ABSTRACT

According to an example embodiment, a 3D providing set of shutter glasses are operated so as to extend their open times beyond a limited duration when the lighting source (e.g., backlighting unit) is providing light and to thus include in the image perceived by the user a proportional amount of ambient light that is directed to and through the shutter glasses during the extended opening time. In one embodiment, a timing control part determines an average grayscale value for each to be displayed image from the received image data and the timing control part correspondingly controls an open time for simultaneously opening the left eye shutter part and the right eye shutter part of the shutter glasses according to the determined average grayscale value of the image data.

21 Claims, 12 Drawing Sheets

(51) Int. Cl.
*G09G 3/00* (2006.01)
*H04N 13/04* (2006.01)
(52) U.S. Cl.
CPC ..... *H04N 13/0438* (2013.01); *H04N 13/0497* (2013.01); *G09G 2310/0237* (2013.01); *G09G 2310/08* (2013.01); *G09G 2320/0247* (2013.01); *G09G 2360/144* (2013.01); *G09G 2360/16* (2013.01); *H04N 2213/008* (2013.01)

(56) References Cited

U.S. PATENT DOCUMENTS

| | | | |
|---|---|---|---|
| 2011/0037837 A1* | 2/2011 | Chiba | H04N 13/0438 348/53 |
| 2011/0134115 A1* | 6/2011 | Araki | H04N 13/0438 345/419 |
| 2011/0254836 A1 | 10/2011 | Kim et al. | |
| 2012/0033060 A1* | 2/2012 | Ko | H04N 13/0438 348/56 |
| 2012/0044333 A1* | 2/2012 | Kang | H04N 13/0438 348/56 |

\* cited by examiner

METHOD OF DRIVING 3D SHUTTER GLASSESES (SPECTACLES), A SHUTTER SPECTACLES APPARATUS FOR PERFORMING THE METHOD AND DISPLAY APPARATUS HAVING THE SHUTTER SPECTACLES APPARATUS

PRIORITY STATEMENT

This application claims priority under 35 U.S.C. § 119 to Korean Patent Application No. 10-2012-0043576, filed on Apr. 26, 2012 in the Korean Intellectual Property Office (KIPO), the contents of which application are herein incorporated by reference in their entireties.

BACKGROUND

1. Field of Disclosure

The present disclosure of invention relates to a method of driving shutter glasses (a.k.a. 3D shutter spectacles), a shutter glasses apparatus for performing the method and a display apparatus having the shutter glasses apparatus. More particularly, embodiments of the present disclosure relate to a method of driving shutter glasses used in conjunction with a 3D image display apparatus, a shutter glasses apparatus for performing the method and a display apparatus having the shutter glasses apparatus.

2. Description of Related Technology

Recently, one method for displaying a three-dimensional (3D) stereoscopic image includes displaying a sequence of 2D images on a flat panel display apparatus such as a liquid crystal display (LCD) and processing the sequence of 2D images to at times create a 3D perception for a user. Display of 3D stereoscopic images is desirable in fields such as interactive computer games and movies. However the displayed sequence of images need not all be 3D. There are times when 2D images can be effectively intermixed with 3D ones.

In one embodiment, a 3D stereoscopic image display apparatus creates its 3D stereoscopic images by alternatingly displaying a left eye image in one frame data and a right eye image in a subsequent frame of a display panel.

In one subclass of such a 3D stereoscopic image display apparatus, so-called, active shutter glasses, or 3D shutter spectacles as they may be called, are used. A left eye shutter of the shutter glasses is opened for a first frame while a right eye shutter of the shutter glasses is closed at the time that a left eye image is being displayed on the display panel. Then, the right eye shutter of the shutter glasses is opened while the left eye shutter of the shutter glasses is closed at the time that a right eye image is being displayed on the display panel.

However and as mentioned above, sometimes within a mix of 3D images of the 3D stereoscopic image display apparatus using the shutter glasses, it may be desirable to insert one or more 2D images. In that case an efficiency (e.g., a backlighting power efficiency) of showing the one or more 2D images through the alternating shutter glasses is decreased and a sense of realism is degraded when the two-dimensional (2D) plane image is displayed through the alternatingly-active spectacles of the 3D shutter glasses.

In addition to this, visibility of the 2D image displayed on the display panel is degraded when ambient light shines on peripheral portions of the display panel and through the shutter glasses and the ambient background light is excessively bright due to emanating from sunlight etc. Improvements for these are provided herein.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Example in accordance with the present disclosure of invention provide a method of driving a set of 3D providing shutter glasses so as to thereby increase an efficiency of a lighting source used to provide backlighting or another form of light sourcing for the corresponding display device.

According to an example embodiment, there is a provided a machine-implemented method of driving the shutter glasses. In the method, an average grayscale value of an image data to be perceived as being displayed on a display panel is analyzed. An open time for simultaneously opening a left eye shutter part and a right eye shutter part of a shutter glasses is controlled according to the determined average grayscale value of the image data. The shutter glasses include the left eye shutter part corresponding to a left eye and the right eye shutter part corresponding to a right eye.

In one embodiment, the open time may be decreased as the determined average grayscale value of the image data is low, and the open time may be increased as the determined average grayscale value of the image data is high.

In one embodiment, a light source driving signal may be further outputted to a light source of the corresponding display device for thereby sourcing a light of the display panel.

In one embodiment, the light source driving signal may be a square wave signal having a corresponding duty ratio.

In one embodiment, a luminance of the light source may be kept substantially constant even though a to be perceived brightness of the displayed images is to be varied.

In one embodiment, a current of the light source driving signal may be increased as the duty ratio of the light source driving signal is decreased, and the current of the light source driving signal may be decreased as the duty ratio of the light source driving signal is increased.

In one embodiment, the open time of the shutter glasses may be substantially equal to or greater than a turn on time of the light source.

In one embodiment, the open time of the shutter glasses may be substantially equal to the turn on time of the light source when the average grayscale value of the image data has minimum value.

In one embodiment, a driving period of the light source may be substantially equal to an open period of the shutter glasses.

In one embodiment, the driving period of the light source and the open period of the shutter glasses may be substantially equal to a frame period of the image data.

In one embodiment, the driving period of the light source and the open period of the shutter glasses may be about ½ of a frame period of the image data.

In one embodiment, the image data may include two-dimensional plane image data.

In one embodiment, an ambient luminance around the shutter glasses may be sensed, and the open time of the shutter glasses may be further controlled according to the sensed illuminance around the shutter glasses.

In one embodiment, the open time of the shutter glasses may be decreased as the sensed illuminance around the shutter glasses is determined to be high, and the open time of the shutter glasses may be increased as the sensed illuminance around the shutter glasses is determined to be relatively low.

In one embodiment, the open time of the shutter glasses may be changed by a setting choice of a user.

According to another example embodiment, a shutter glasses apparatus includes a shutter glasses and a timing control part. The shutter glasses include a left eye shutter part corresponding to a left eye and a right eye shutter part corresponding to a right eye. The timing control part automatically analyzes an average grayscale value of an image data to be displayed on a display panel, and controls an open time for simultaneously opening the left eye shutter part and the right eye shutter part of the shutter glasses according to the determined average grayscale value of the image data.

In one embodiment, the open time may be decreased as the determined average grayscale value of the image data is relatively low, and the open time may be increased as the determined average grayscale value of the image data is relatively high.

In one embodiment, the shutter glasses apparatus may further includes a light source providing a light to the display panel, and a luminance of the light source may be constant.

According to still another example embodiment, a display apparatus includes a display panel and a shutter glasses apparatus. The display panel displays an image in accordance with received image data. The shutter glasses apparatus includes a shutter glasses including a left eye shutter part corresponding to a left eye and a right eye shutter part corresponding to a right eye, and a timing control part analyzing an average grayscale value of the image data displayed on the display panel and controlling an open time for simultaneously opening the left eye shutter part and the right eye shutter part of the shutter glasses according to the determined average grayscale value of the image data.

In one embodiment, the open time may be decreased as the average grayscale value of the image data is low, and the open time may be increased as the average grayscale value of the image data is high.

According to the present disclosure of invention, an open time of the shutter glasses is controlled according to an automatically determined average grayscale value (AGV) of an image data to change an ambient amount of brightness around the shutter glasses (e.g., that reflected off the display screen) that is let through and then seen through the shutter glasses as if it were part of the displayed image, whereby a power efficiency of the backlighting system may be increased by operating the shutter glasses so as to let through reflected ambient light when desirable and a sense of realism may be enhanced.

In addition, the open time of the shutter glasses is controlled according to an illuminance around the shutter glasses to change ambient (e.g., reflected) brightness around the shutter glasses as seen through the shutter glasses, and thus visibility of the image data may be improved.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION

Hereinafter, the present teachings will be explained in detail with reference to the accompanying drawings.

Figure 1:
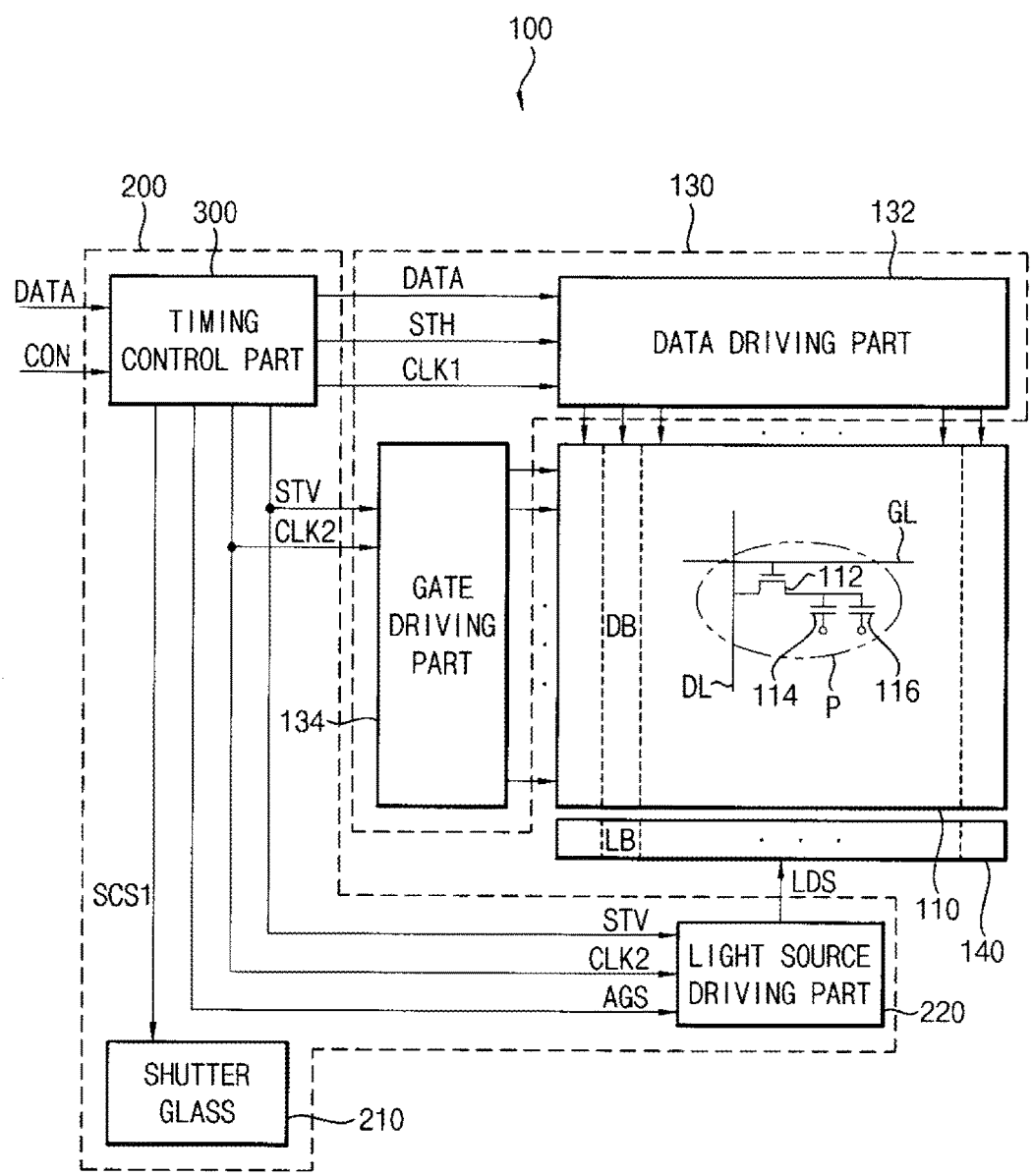
FIG. 1 is a block diagram illustrating a display apparatus according to an example embodiment of the present disclosure of invention.

FIG. 1 is a block diagram illustrating a display apparatus according to a first embodiment of the present disclosure of invention.

Referring to FIG. 1, the display apparatus 100 shown there includes a display panel 110, a panel driving part 130, a light source module 140 and a shutter glasses apparatus 200 (which shutter glasses apparatus 200 may be worn by a user (not shown)).

The display panel receives digital image data DATA from an external source to be used to display a corresponding image. The display panel 110 includes a plurality of gate lines GL (only one shown), a plurality of data lines DL (only one shown) and a plurality of pixel units P (only one shown). For example, the display panel 110 may include an M*N matrix (where M and N are natural numbers) of the pixel units P. Each of the pixel units P includes a thin-film transistor 112 electrically connected to a corresponding one of the gate lines GL and to a corresponding one of the data lines DL, a liquid crystal capacitor 114 and a storage capacitor 116 connected to the thin-film transistor 112. The display area (DA) of the display panel 110 may be subdivided into a plurality of display blocks DB each corresponding to a lighting block LB of a backlight providing light source module 140.

The shutter glasses subsystem of the apparatus incorporates use of a set of shutter glasses 210, of a light source driving part 220 and of corresponding portions of a timing control part 300.

The shutter glasses 210 include a left eye shutter part corresponding to a left eye and a right eye shutter part corresponding to a right eye of the user. The shutter glasses 210 alternatingly open and close for the left eye shutter part and 180 degrees out of synch for the right eye shutter part when the respective image portions; as represented by the received data, DATA define corresponding three-dimensional (3D) stereoscopic image data. In addition, the shutter glasses 210 of the present disclosure simultaneously open and close both of the left eye shutter part and the right eye shutter part in each frame when the received image data DATA is indicated to be two-dimensional plane image data. Additionally, a light source part (e.g., backlighting part) 140 may be operated at reduced power when both the left and right eye shutter parts are being simultaneously opened in each frame to let through a proportional amount of additional ambient light.

The timing control part 300 receives the inputted image data signal, DATA and a control signal CON from an outside source. The control signal CON may include a horizontal synchronous signal Hsync, a vertical synchronous signal Vsync, a clock signal and, optionally; an indication of when the inputted image data signal, DATA represents 3D imagery and when it represents 2D imagery. (An alternative to having an express 2D/3D indication signal is to automatically determine if the left and right frame data signals are essentially identical or not.)

The timing control part 300 generates a horizontal start signal STH using the horizontal synchronous signal Hsync and outputs the horizontal start signal STH to a data lines driving part 132. In addition, the timing control part 300 generates a vertical start signal STV using the vertical synchronous signal Vsync and outputs the corresponding vertical start signal STV to a gate lines driving part 134. In addition, the timing control part 300 generates a first clock signal CLK1 and a second clock signal CLK2 and outputs the first clock signal CLK1 to the data lines driving part 132 and the second clock signal CLK2 to the gate lines driving part 134.

The timing control part 300 further outputs a shutter glasses controlling signal SCS1 for controlling the shutter glasses 210 in accordance with whether the inputted image data signal, DATA represents 3D imagery or 2D imagery. More specifically and in one embodiment, the timing control part 300 analyzes an average grayscale value of the image data DATA, and outputs the shutter glasses controlling signal SCS1 for simultaneously opening the left eye shutter part and the right eye shutter part of the shutter glasses 210 in a frame period according to the determined average grayscale value of the image data DATA.

The timing control part 300 decreases an open time of the shutter glasses 210 in the frame period as the average grayscale value of the image data DATA is determined to be relatively low as compared to a predefined threshold. Thus, the timing control part 300 decreases the open time (e.g., the duty cycle ratio) of the shutter glasses 210 (and also a corresponding powering of the light source module 140) in a frame period where the image represented by the image data DATA is relatively dark. By contrast, the timing control part 300 increases the open time (e.g., the duty cycle ratio) of the shutter glasses 210 in the frame period when it is automatically determined that the average grayscale value of the image data DATA is relatively high (e.g., as compared to a predefined threshold). Thus, the timing control part 300 progressively increases the open time (e.g., the duty cycle ratio) of the shutter glasses 210 as the image data DATA of respective frames progressively becomes brighter and the timing control part 300 progressively decreases the open time (e.g., the duty cycle ratio) of the shutter glasses 210 as the image data DATA of respective frames progressively becomes darker.

For example, the timing control part 300 may open the shutter glasses 210 for a first time in the frame period when the average grayscale value of the image data DATA is a first value, and may open the shutter glasses 210 for a second time that is longer (e.g., a larger duty cycle ratio) in the frame period when the average grayscale value of the corresponding image data DATA is a second value higher than the first value.

The image data may be a two-dimensional plane image data, and the left eye shutter part and the right eye shutter part of the shutter glasses 210 may be simultaneously opened and closed by the shutter glasses controlling signal SCS1 outputted from the timing control part 300.

Figure 2:
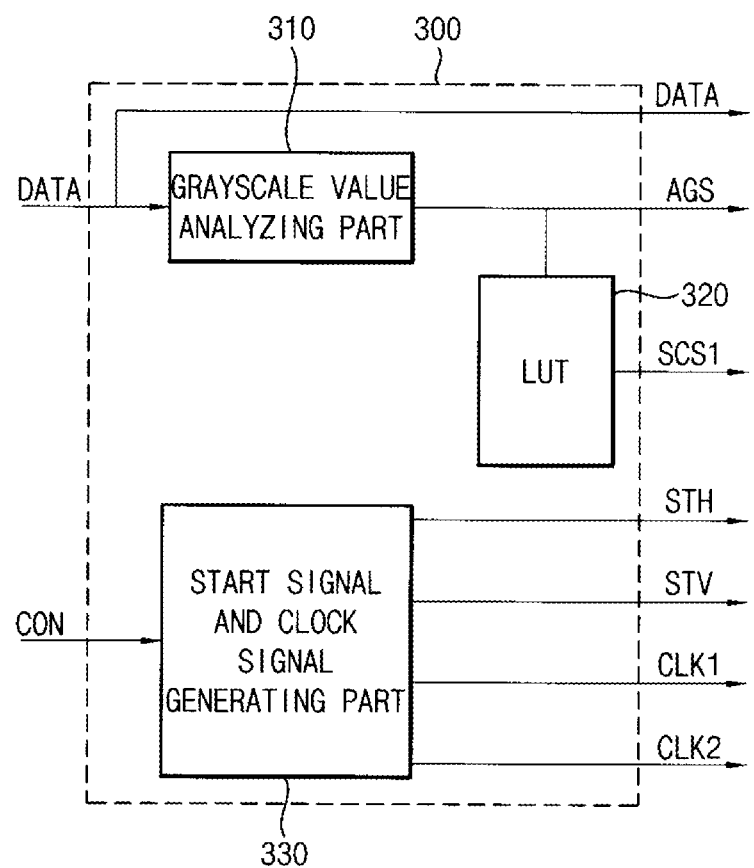
FIG. 2 is a block diagram illustrating a timing control part of FIG. 1.

FIG. 2 is a block diagram illustrating a portion of the timing control part 300 of FIG. 1 that controls the shutter glasses 210 and controls the light source driving part 220. It is to be understood that the timing control part 300 may have other portions and may be much more complex in internal structure. However, for purposes of this disclosure it is sufficient to appreciate that the timing control part 300 includes a grayscale value analyzing part 310 and a lookup table (LUT) 320 that is responsive to an output of the analyzing part 310.

Referring to FIGS. 1 and 2, the timing control part 300 includes the aforementioned grayscale value analyzing part 310, the lookup table (LUT) 320 and also a start signal and clock signal generating part 330.

The grayscale value analyzing part 310 receives the externally supplied image data signal DATA and analyzes the average grayscale value of the imagery represented by the data signal DATA. The grayscale value analyzing part 310 correspondingly outputs an average grayscale value signal AGS for each respective frame or other such partition of the image that is to be displayed in the display area (DA) of the display device (e.g., in each display block DB).

The lookup table (LUT) 320 responsively outputs the shutter glasses controlling signal SCS1 in response to the average grayscale value signal AGS outputted from the grayscale value analyzing part 310. The respective open times (e.g., duty cycle values) or equivalents for the shutter glasses 210 according to the corresponding average grayscale values of the image data DATA may be stored as respective lookup entries in the lookup table 320. Alternatively or additionally, extrapolation and/or one or more determination formulas may be used to determine a specific duty cycle value.

The start signal and clock signal generating part 330 receives the control signal CON and outputs the horizontal start signal STH, the vertical start signal STV, the first clock signal CLK1 and the second clock signal CLK2 using the control signal CON.

Referring back to FIG. 1, the light source driving part 220 outputs a light source driving signal LDS driving the light source module 140 in response to the vertical start signal STV, the second clock signal CLK2 and the average grayscale value signal AGS outputted from the timing control part 300. Thus the driving of the light source module 140 and the driving of the shutter glasses 210 are both coordinated relative to the determined AGS value.

For example, the light source driving part 220 may turn on a light source (e.g., one or more light emitting diodes (LEDs) and/or a fluorescent source) in the light source module 140 for a first time duration T1 in the frame period when the average grayscale value (AGV) of the image data DATA is determined to have a first value (AGV1), and may turn on the light source in the light source module 140 for a different and second time duration T2 in the frame period when the average grayscale value of the image data DATA is determined to have a corresponding and different second value (AGV2) that is higher than the first value (AGV1).

The panel driving part 130 includes the data lines driving part 132 and the gate lines driving part 134.

The data lines driving part 132 outputs analog signals corresponding to the received image data DATA to the respective data lines DL in synchronization with the first clock signal CLK1 and the horizontal start signal STH provided from the timing control part 300.

The gate lines driving part 134 generates respective gate signals for corresponding gate lines by using the vertical start signal STV and the second clock signal SLK2 provided from the timing control part 300 and outputs the corresponding gate signals to the respective gate lines GL.

The light source module 140 includes the light source and provides a light to the display panel 110. The light source module 140 may includes a plurality of light source blocks LB each corresponding to a respective one of the display blocks DB of the display panel 110. For example, the light source in the light source module 140 may include light emitting diodes (LEDs; e.g., white and/or R, G and B LEDs).

Figure 3:
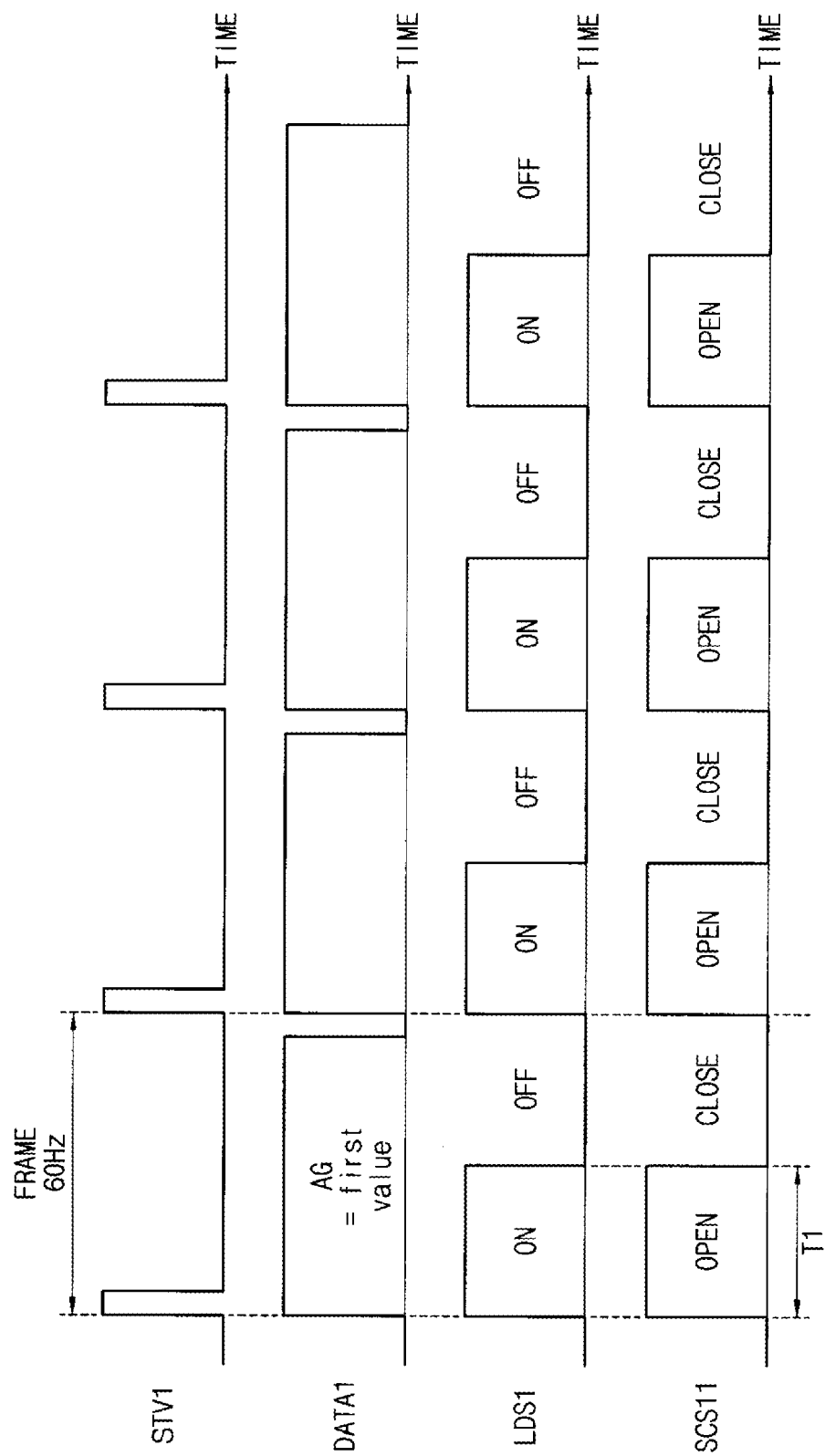
FIG. 3 is an exemplary waveform diagram illustrating a vertical start signal, an image data, a light source driving signal and a shutter glasses controlling signal applied to the display apparatus of FIG. 1.

FIG. 3 is an exemplary waveform diagram illustrating a vertical start signal STV1, a first image data DATA1 (having a corresponding AVG1 value), a light source driving signal LDS1 and a shutter glasses controlling signal SCS11 as may be applied to the display apparatus of FIG. 1.

Referring to FIGS. 1 and 3, in this example the average grayscale value AGV1 of the first image data DATA1 has a first value that is comparatively low, and a frame period of the image data DATA1 corresponds to about 60 Hz (is the reciprocal thereof).

The light source driving signal LDS1 may be a square wave signal. The light source in the light source module 140 may be turned on when the light source driving signal LDS1 is in a binary high state, and the light source in the light source module 140 may be turned off when the light source driving signal LDS1 is in the low state. Alternatively, the light source in the light source module 140 may be turned off when the light source driving signal LDS1 is high state, and the light source in the light source module 140 may be turned on when the light source driving signal LDS1 is low state.

The light source in the light source module 140 may be turned on for a first time T1 when the average grayscale value AG of the image data DATA1 is the first value AVG1. For example, a duty ratio of the light source driving signal LDS1 applied to the light source module 140 from the light source driving part 220 may be about 40%.

A period of the light source driving signal LDS1 may correspond to about 60 Hz. Thus, the period of the light source driving signal LDS1 may be increased to be about as large as the frame period of the image data DATA.

Since in FIG. 3 the average grayscale value AG of the image data DATA1 has the first value (AGV1<AGV2) that is comparatively low, and since the shutter glasses 210 are opened for the first time T1 which is comparatively short in the frame period by the shutter glasses controlling signal SCS11, the amount of light passed to the user's eyes is also comparatively low and the user perceives a relatively dark image. For example, a duty ratio of the shutter glasses controlling signal SCS11 may be about 40%. Thus, brightness around the shutter glasses 210 seen through the shutter glasses 210 is decreased.

In one embodiment, a minimum time for which the shutter glasses 210 are opened is made substantially equal to a turn on time of the light source in the light source module 140. Thus, the open time of the shutter glasses 210 is equal to or greater than the turn on time of the light source in the light source module 140. Thus, the duty ratio of the shutter glasses controlling signal SCS11 may be equal to the duty ratio of the light source driving signal LDS1 when the average grayscale value AG of the image data DATA1 is a predetermined minimum value (AGVmin).

A period of the shutter glasses controlling signal SCS11 may correspond to about 60 Hz. Thus, the period of the shutter glasses controlling signal SCS11 may be equal to the frame period of the image data DATA1 and the period of the light source driving signal LDS1.

The shutter glasses 210 are opened when the shutter glasses controlling signal SCS11 is in a binary high state and the shutter glasses 210 is closed when the shutter glasses controlling signal SCS11 is low state. Alternatively, the shutter glasses 210 may be opened when the shutter glasses controlling signal SCS11 is low state and the shutter glasses 210 is closed when the shutter glasses controlling signal SCS11 is high state.

Figure 4:
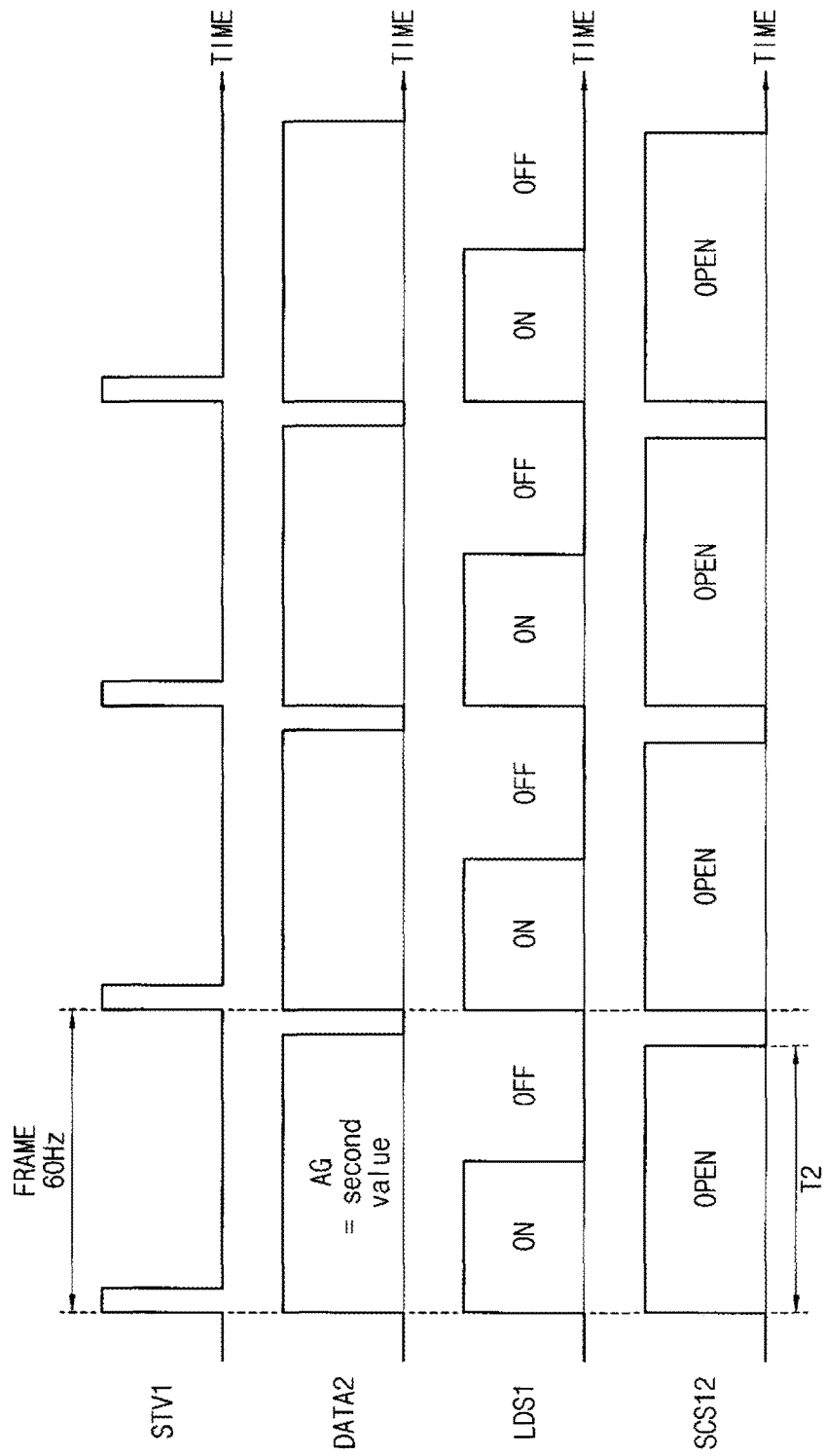
FIG. 4 is another exemplary waveform diagram illustrating the vertical start signal, an image data, the light source driving signal and a shutter glasses controlling signal applied to the display apparatus of FIG. 1.

FIG. 4 is another exemplary waveform diagram illustrating the vertical start signal STV1, a second image data signal DATA2, where the corresponding light source driving signal LDS1 and a second shutter glasses controlling signal SCS12 are applied in the display apparatus of FIG. 1.

Referring to FIGS. 1 and 4, an average grayscale value AG of the second image data DATA2 has a second value (AGV2>AGV1) that is comparatively high, and a frame period of the image data DATA2 corresponds to about 60 Hz.

In this example the light source in the light source module 140 may be turned on for the first time T1 when the average grayscale value AG of the image data DATA2 is the second value AGV2. For example, the duty ratio of the light source driving signal LDS1 applied to the light source module 140 from the light source driving part 220 may be about 40%. Alternatively, the duty ratio of the light source driving signal LDS1 may be increased when the average grayscale value AG of the image data DATA is the second value, and a current of the light source driving signal LDS1 may be decreased as the duty ratio of the light source driving signal LDS1 increases. Thus, a luminance of the light source is relatively constant and its power consumption does not increase, and a luminance of the image data DATA displayed on the display panel 110 by the light source module 140 may be constant.

The period of the light source driving signal LDS1 may correspond to about 60 Hz. Thus, the period of the light source driving signal LDS1 may be equal to the frame period of the image data DATA2.

The average grayscale value AG of the second image data DATA2 has the second value AGV2 which is comparatively high, and thus the shutter glasses 210 are opened for a second time T2 which is comparatively long and longer than the first time T1 in the frame period by the shutter glasses controlling signal SCS12. For example, a duty ratio of the shutter glasses controlling signal SCS12 may be about 90%. Thus, ambient brightness around the shutter glasses 210 seen through the shutter glasses 210 is increased.

Figure 5:
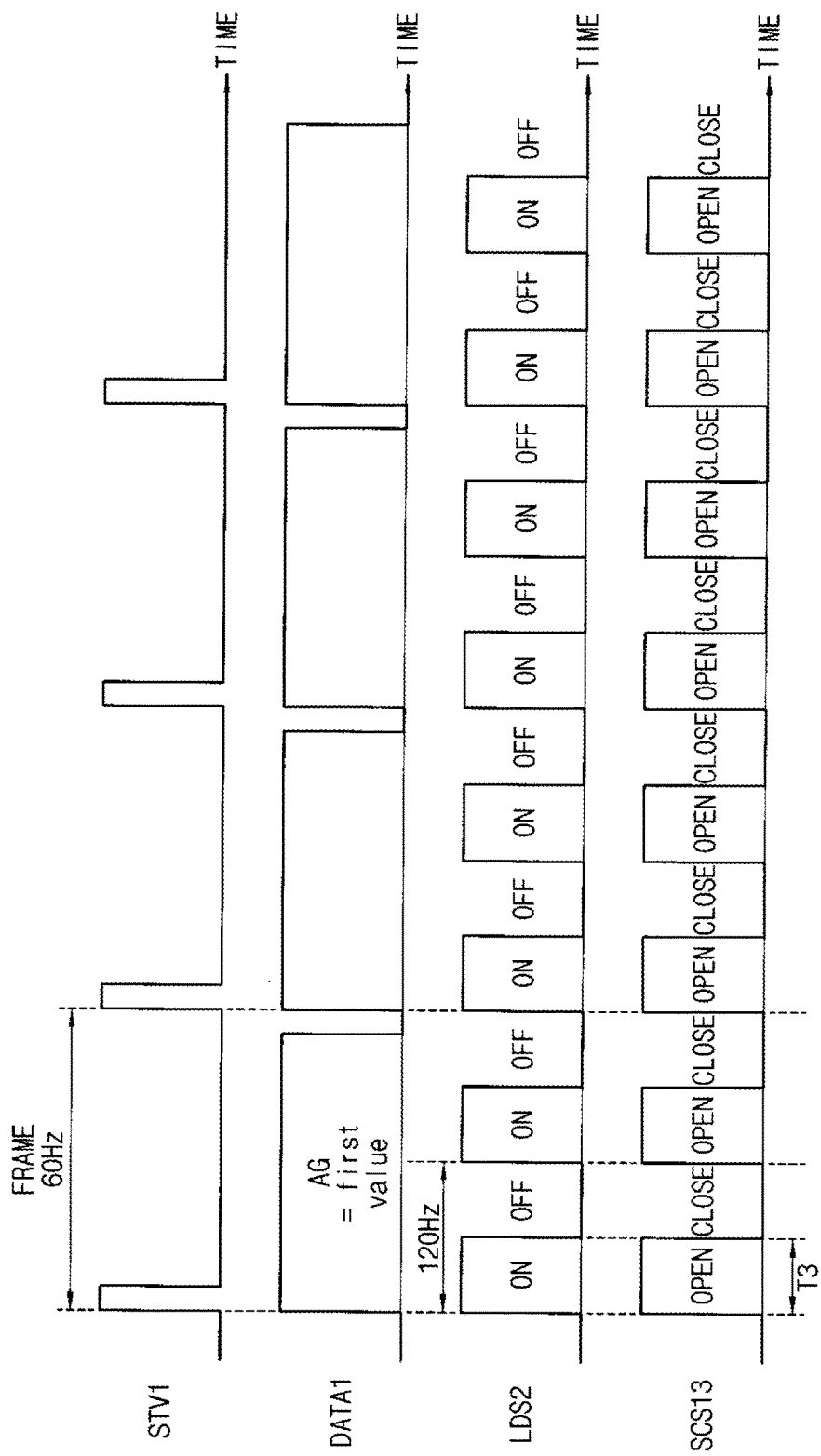
FIG. 5 is still another exemplary waveform diagram illustrating the vertical start signal, the image data, a light source driving signal and a shutter glasses controlling signal applied to the display apparatus of FIG. 1.

FIG. 5 is still another exemplary waveform diagram illustrating the vertical start signal STV1, the image data DATA1, a light source driving signal LDS2 and a shutter glasses controlling signal SCS13 applied to the display apparatus of FIG. 1.

Referring to FIGS. 1 and 5, the average grayscale value AG of the image data DATA1 has the first value AGV1 which is comparatively low, and the frame period of the image data DATA1 corresponds to about 60 Hz.

The light source in the light source module 140 may be turned on for a third time T3 when the average grayscale value AG of the image data DATA1 is the first value AGV1. For example, a duty ratio of the light source driving signal LDS2 applied to the light source module 140 from the light source driving part 220 may be about 40%.

A period of the light source driving signal LDS2 may correspond to about 120 Hz. Thus, the period of the light source driving signal LDS2 may be about ½ of the frame period of the image data DATA1.

The average grayscale value AG of the image data DATA1 has the first value AGV1 which is comparatively low, and thus the shutter glasses 210 is opened for a third time T3 comparatively short in the frame period by the shutter glasses controlling signal SCS13. For example, a duty ratio of the shutter glasses controlling signal SCS13 may be about 40%. Thus, ambient brightness around the shutter glasses 210 seen through the shutter glasses 210 is decreased.

A period of the shutter glasses controlling signal SCS13 may corresponds to about 120 Hz. Thus, the period of the shutter glasses controlling signal SCS13 may be equal to the period of the light source driving signal LDS2. The period of the light source driving signal LDS2 and the period of the shutter glasses controlling signal SCS13 is about ½ of the frame period of the image data DATA1, and thus a flicker may be decreased.

Figure 6:
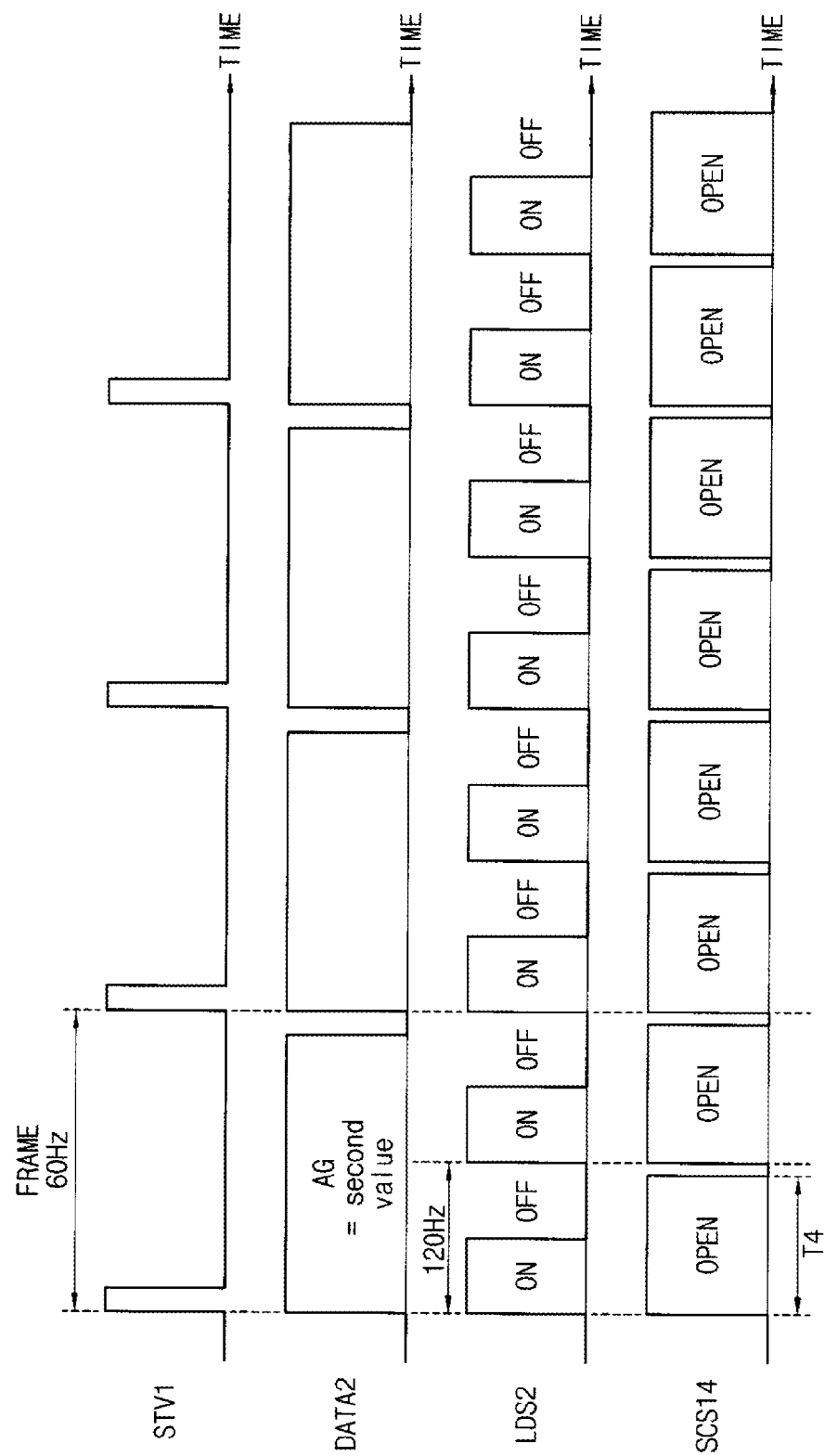
FIG. 6 is still another exemplary waveform diagram illustrating the vertical start signal, the image data, the light source driving signal and a shutter glasses controlling signal applied to the display apparatus of FIG. 1.

FIG. 6 is still another exemplary waveform diagram illustrating the vertical start signal STV1, the image data DATA2, the light source driving signal LDS2 and a shutter glasses controlling signal SCS14 applied to the display apparatus of FIG. 1.

Referring to FIGS. 1 and 6, the average grayscale value AG of the image data DATA2 has the second value AGV2 which is comparatively high, and the frame period of the image data DATA2 corresponds to about 60 Hz.

The period of the light source driving signal LDS2 may correspond to about 120 Hz. Thus, the period of the light source driving signal LDS2 may be about ½ of the frame period of the image data DATA2.

The average grayscale value AG of the image data DATA2 has the second value AGV2 which is comparatively high, and thus the shutter glasses 210 is opened for a fourth time T4 which is comparatively long and longer than the third time T3 in the frame period by the shutter glasses controlling signal SCS14. For example, a duty ratio of the shutter glasses controlling signal SCS14 may be about 90%. Thus, ambient brightness around the shutter glasses 210 seen through the shutter glasses 210 is increased.

A period of the shutter glasses controlling signal SCS14 may correspond to about 120 Hz. Thus, the period of the shutter glasses controlling signal SCS14 may be equal to the period of the light source driving signal LDS2. The period of the light source driving signal LDS2 and the period of the shutter glasses controlling signal SCS14 is about ½ of the frame period of the image data DATA2, and thus a flicker may be decreased.

Figure 7:
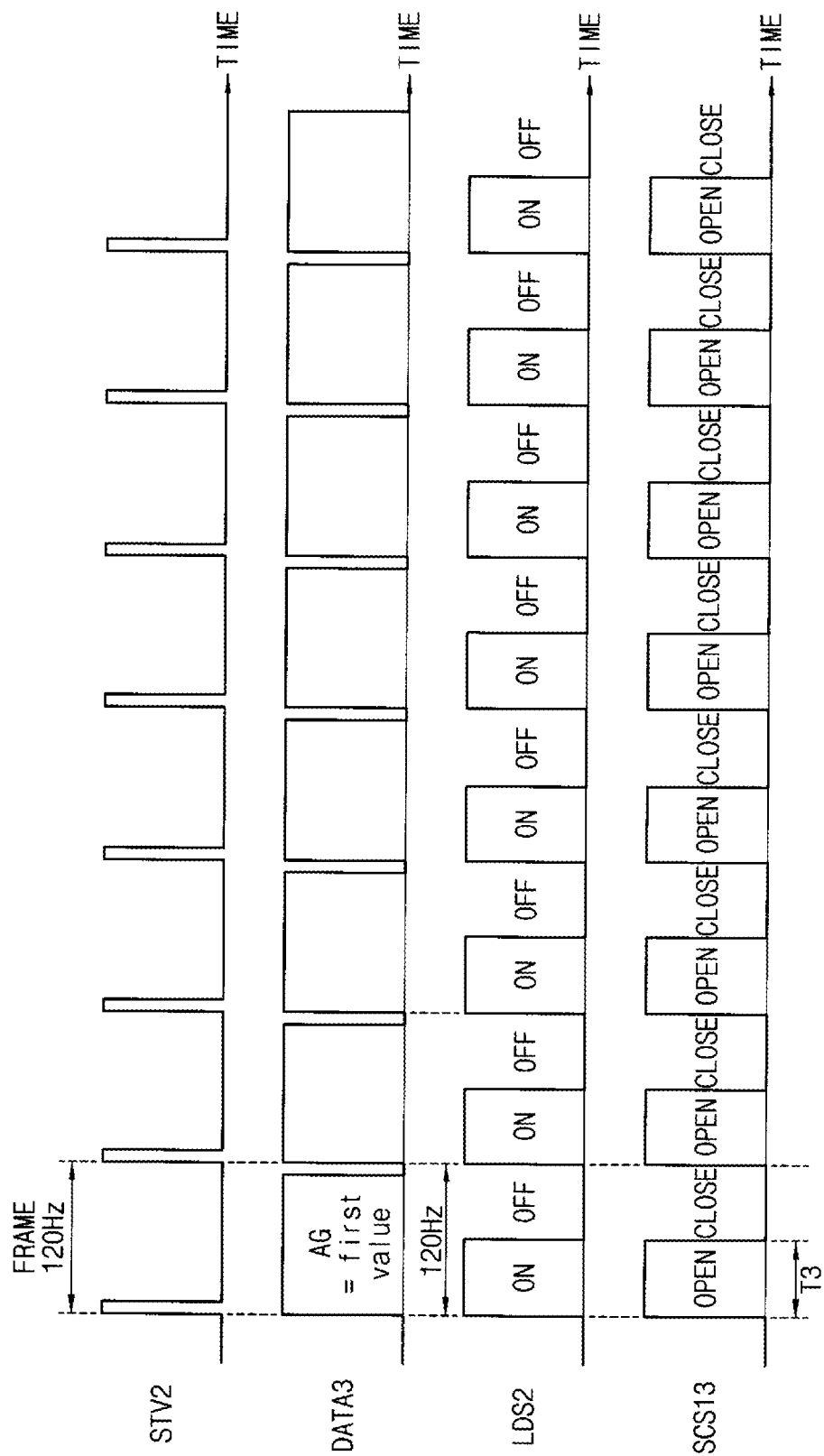
FIG. 7 is still another exemplary waveform diagram illustrating a vertical start signal, an image data, the light source driving signal and the shutter glasses controlling signal applied to the display apparatus of FIG. 1.

FIG. 7 is still another exemplary waveform diagram illustrating a vertical start signal STV2, an image data DATA3, the light source driving signal LDS2 and the shutter glasses controlling signal SCS13 applied to the display apparatus of FIG. 1.

Referring to FIGS. 1 and 7, an average grayscale value AG of the image data DATA3 has the first value AGV1 which is comparatively low, and a frame period of the image data DATA3 corresponds to about 120 Hz.

The period of the light source driving signal LDS2 may correspond to about 120 Hz. Thus, the period of the light source driving signal LDS2 may be equal to the frame period of the image data DATA3.

The average grayscale value AG of the image data DATA3 has the first value AGV1 which is comparatively low, and thus the shutter glasses 210 are opened for the third time T3 which is comparatively short in the frame period by the shutter glasses controlling signal SCS13. For example, the duty ratio of the shutter glasses controlling signal SCS13 may be about 40%. Thus, the amount of ambient brightness around the shutter glasses 210 and seen through the shutter glasses 210 is decreased.

The period of the shutter glasses controlling signal SCS13 may correspond to about 120 Hz. Thus, the period of the shutter glasses controlling signal SCS13 may be equal to the frame period of the image data DATA3 and the period of the light source driving signal LDS2.

Figure 8:
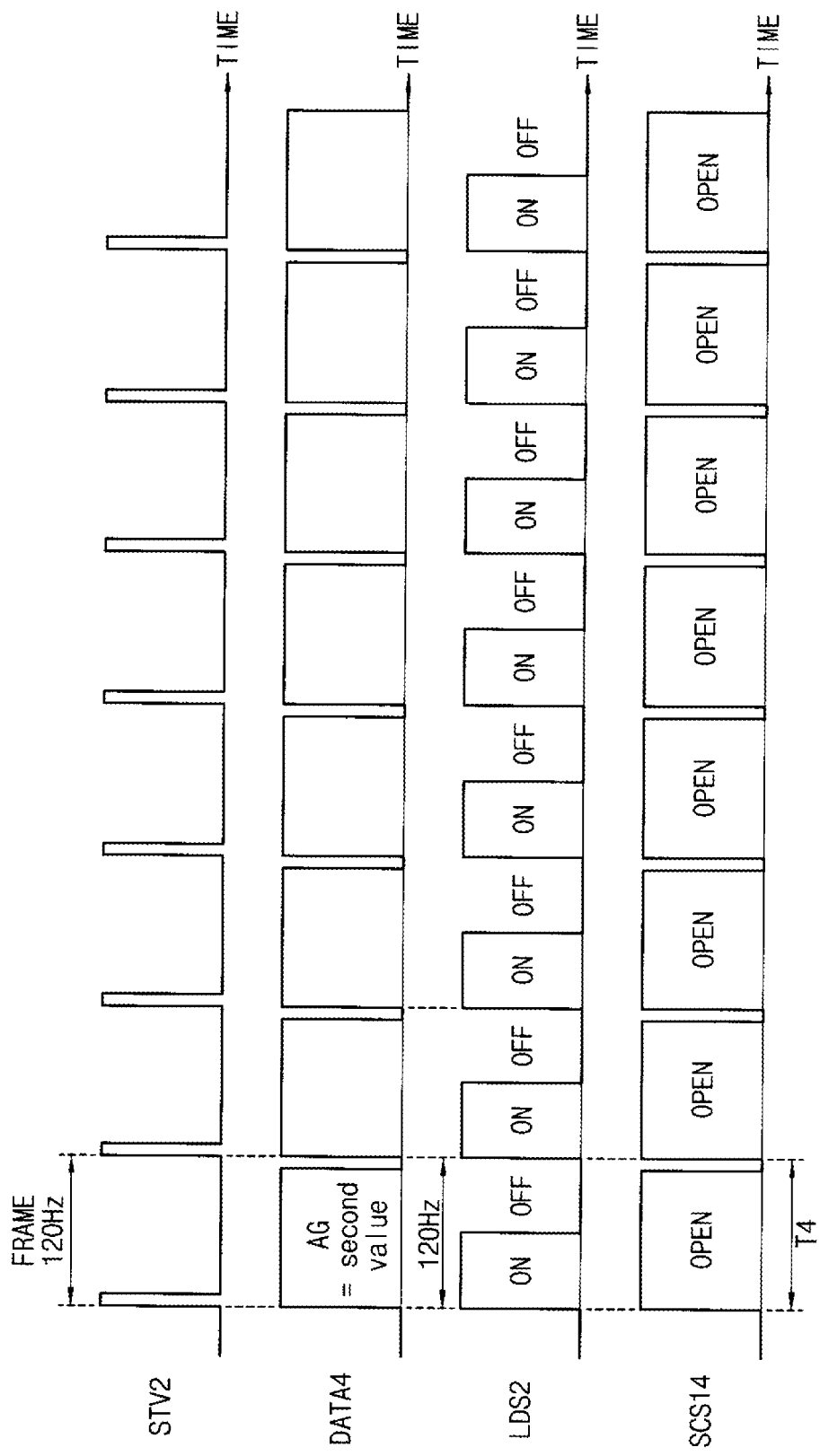
FIG. 8 is still another exemplary waveform diagram illustrating the vertical start signal, an image data, the light source driving signal and the shutter glasses controlling signal applied to the display apparatus of FIG. 1.

FIG. 8 is still another exemplary waveform diagram illustrating the vertical start signal STV2, an image data DATA4, the light source driving signal LDS2 and the shutter glasses controlling signal SCS14 applied to the display apparatus of FIG. 1.

Referring to FIGS. 1 and 8, an average grayscale value AG of the image data DATA4 has the second value AGV2 which is comparatively high, and a frame period of the image data DATA4 corresponds to about 120 Hz.

The period of the light source driving signal LDS2 may correspond to about 120 Hz. Thus, the period of the light source driving signal LDS2 may be equal to the frame period of the image data DATA4.

The average grayscale value AG of the image data DATA4 has the second value AGV2 (>AGV1) which is comparatively high, and thus the shutter glasses 210 are opened for the fourth time T4 which is comparatively long and longer than the third time T3 in the frame period by the shutter glasses controlling signal SCS14. For example, the duty ratio of the shutter glasses controlling signal SCS14 may be about 90%. Thus, brightness around the shutter glasses 210 and as seen through the shutter glasses 210 is increased.

The period of the shutter glasses controlling signal SCS14 may correspond to about 120 Hz. Thus, the period of the shutter glasses controlling signal SCS14 may be equal to the frame period of the image data DATA4 and the period of the light source driving signal LDS2.

Figure 9:
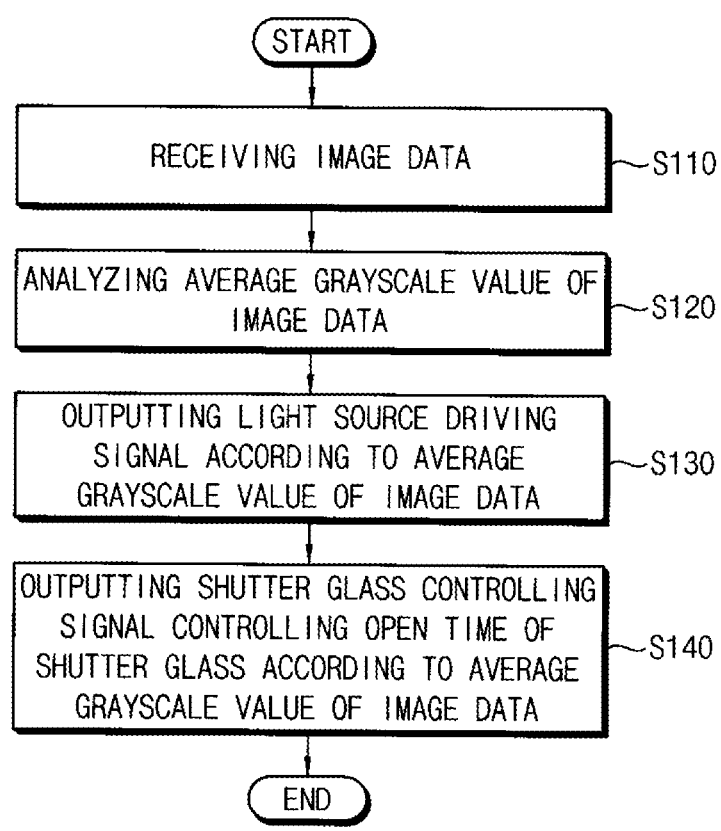
FIG. 9 is a flow chart illustrating a method of driving a shutter glasses performed by a shutter glasses apparatus of FIG. 1.

FIG. 9 is a flow chart illustrating a machine-implemented method of driving a shutter glasses as performed by the shutter glasses apparatus 200 of FIG. 1.

Referring to FIGS. 1 to 9, the timing control part 300 repeatedly and automatically receives the image data DATA (step S110). A period of the image data DATA may correspond to about 60 Hz as the period of the image data DATA1 of FIG. 3. Alternatively, the period of the image data DATA may correspond to about 120 Hz as the period of the image data DATA3 of FIG. 7.

The grayscale value analyzing part 310 in timing control part 300 automatically analyzes the average grayscale value AG of the received image data DATA and automatically outputs the corresponding average grayscale value signal AGS (step S120).

The average grayscale value AG may have the first value AGV1 which is comparatively low as illustrated in FIGS. 3, 5 and 7. Alternatively, the average grayscale value AG may have the second value AGV2 which is comparatively high and higher than the first value as illustrated in FIGS. 4, 6 and 8.

The light source driving part 220 then responsively outputs the light source driving signal LDS to the light source module 140 in accordance with the average grayscale value signal AGS (step S130). For example, a duty ratio of the light source driving signal LDS may be low as the average grayscale value AG of the image data DATA is low.

A period of the light source driving signal LDS may correspond to about 60 Hz as the period of the light source driving signal LDS1 of FIGS. 3 and 4. Alternatively, the period of the light source driving signal LDS may correspond to about 120 Hz as the period of the light source driving signal LDS2 of FIGS. 5 to 8.

The lookup table 320 outputs the shutter glasses controlling signal SCS1 for thereby controlling the open time of the shutter glasses 210 to the shutter glasses 210 in response to the average grayscale value signal AGS (step S140). Alternatively or additionally one or more predefined extrapolation and/or calculation algorithms may be used to convert each received average grayscale value signal AGS into a corresponding setting for the shutter glasses controlling signal SCS1.

Specifically in one embodiment, the timing control part 300 decreases a duty ratio of the shutter glasses controlling signal SCS1 to thereby decrease the open time of the shutter glasses 210 in correspondence to the average grayscale value AG of the image data DATA being low. In addition, the timing control part 300 increases the duty ratio of the shutter glasses controlling signal SCS1 to increase the open time of the shutter glasses 210 as the average grayscale value AG of the image data DATA is higher.

For example, the shutter glasses 210 may be opened for the first time T1 as illustrated in FIG. 3 by the shutter glasses controlling signal SCS1 when the average grayscale value AG of the image data DATA has the first value. In addition, the shutter glasses 210 may be opened for the second time T2 longer than the first time T1 as illustrated in FIG. 4 by the shutter glasses controlling signal SCS1 when the average grayscale value AG of the image data DATA has the second value higher than the first value.

The open time of the shutter glasses 210 according to the average grayscale value AG of the image data DATA may be stored in the lookup table (LUT) 320.

According to the present example embodiment, the open time of the shutter glasses 210 is controlled according to the average grayscale value AG of the image data DATA to thereby change an amount of ambient brightness around the shutter glasses 210 which is allowed to be seen through the shutter glasses 210 in addition to the backlighted image that is passed through the shutter glasses 210. As a result of this operation, the backlighting subsystem 140 does not need to supply a white light and/or another background amount of light that otherwise might desirably be added to the backlighted image that is passed through the shutter glasses 210 and thus an efficiency of the backlighting subsystem 140 may be increased and a sense of realism may be enhanced when the added background amount of light matches the user's surroundings.

Figure 10:
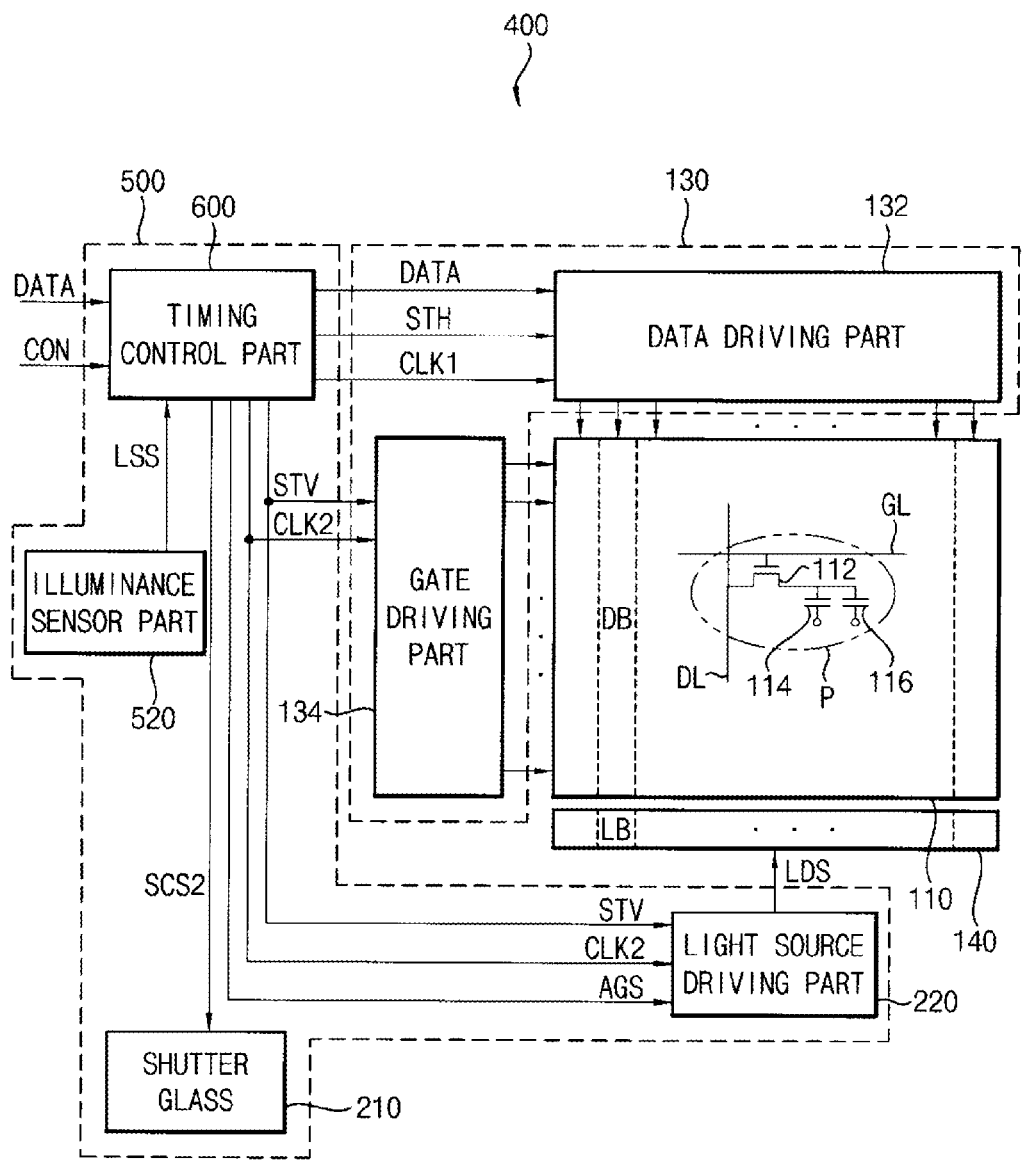
FIG. 10 is a block diagram illustrating a display apparatus according to another example embodiment.

FIG. 10 is a block diagram illustrating a display apparatus according to another example embodiment in accordance with the present disclosure of invention.

The display apparatus 400 according to the present example embodiment is substantially the same as the display apparatus 100 according to the previous example embodiment illustrated in FIG. 1 except for addition of an illuminance sensor part 520 and a responsive timing control part 600 of a shutter glasses apparatus 500. Thus, the same reference numerals will be used to refer to same or like parts as those described in the previous example embodiment and any further repetitive explanation concerning the above elements will be omitted.

Referring to FIG. 10, the display apparatus 400 according to the present example embodiment includes the display panel 110, the panel driving part 130, the light source module 140, the shutter glasses apparatus 500.

The shutter glasses apparatus 500 includes the shutter glasses 210, the light source driving part 150, the illuminance sensor part 520 and the timing control part 600.

The illuminance sensor part 520 senses an illuminance around the shutter glasses 210 that will be passed through the shutter glasses 210 if they are left open after the light source 140 stops outputting its light and the illuminance sensor part 520 correspondingly outputs an illuminance sensing signal LSS to the timing control part 600.

The timing control part 600 receives the image data DATA and the control signal CON from the outside. The control signal may include the horizontal synchronous signal Hsync, the vertical synchronous signal Vsync and the clock signal.

The timing control part 600 generates the horizontal start signal STH using the horizontal synchronous signal Hsync and outputs the horizontal start signal STH to the data driving part 132. In addition, the timing control part 600 generates the vertical start signal STV using the vertical synchronous signal Vsync and outputs the vertical start signal STV to the gate driving part 134. In addition, the timing control part 300 generates the first clock signal CLK1 and the second clock signal CLK2 and outputs the first clock signal CLK1 to the data lines driving part 132 and the second clock signal CLK2 to the gate lines driving part 134.

The timing control part 600 further outputs a shutter glasses controlling signal SCS2 controlling the shutter glasses 210. Specifically, the timing control part 600 outputs the shutter glasses controlling signal SCS2 for simultaneously opening the left eye shutter part and the right eye shutter part of the shutter glasses 210 in the frame period according to the average grayscale value of the image data DATA and according to the illuminance around the shutter glasses 210.

The timing control part 600 decreases the open time of the shutter glasses 210 in the frame period as the average grayscale value of the image data DATA is low. Thus, the timing control part 600 decreases the open time of the shutter glasses 210 in frame period as the image data DATA is dark. In addition, the timing control part 600 increases the open time of the shutter glasses 210 in the frame period as the average grayscale value of the image data DATA is desired to be high (in other words, have a significant amount or white or other brightness enhancing light level included as part of the perceived image). Thus, the timing control part 600 increases the open time of the shutter glasses 210 so as to let in the sensed ambient light in the frame period in the case where the displayed image corresponding to the received image data DATA is desired to be bright.

For example, the timing control part 600 may open the shutter glasses 210 for the first time in the frame period when the average grayscale value of the image data DATA is the first value, and may open the shutter glasses 210 for the second time which is longer than the first time in the frame period when the average grayscale value of the image data DATA is the second value which is higher than the first value.

In addition, the timing control part 600 decreases the open time of the shutter glasses 210 in the frame period as the illuminance around the shutter glasses 210 is sensed to be higher.

For example, the timing control part 600 may open the shutter glasses 210 for a third time in the frame period when the illuminance around the shutter glasses 210 is sensed to have a third value, and may open the shutter glasses 210 for a fourth time longer than the third time in the frame period when the illuminance around the shutter glasses 210 is sensed to have a fourth value which is higher than the third value.

In addition, the open time of the shutter glasses 210 may be changed by a setting choice made by a user of the display system. This can be yet another input into the illustrated LUT 620 of next described FIG. 11.

Figure 11:
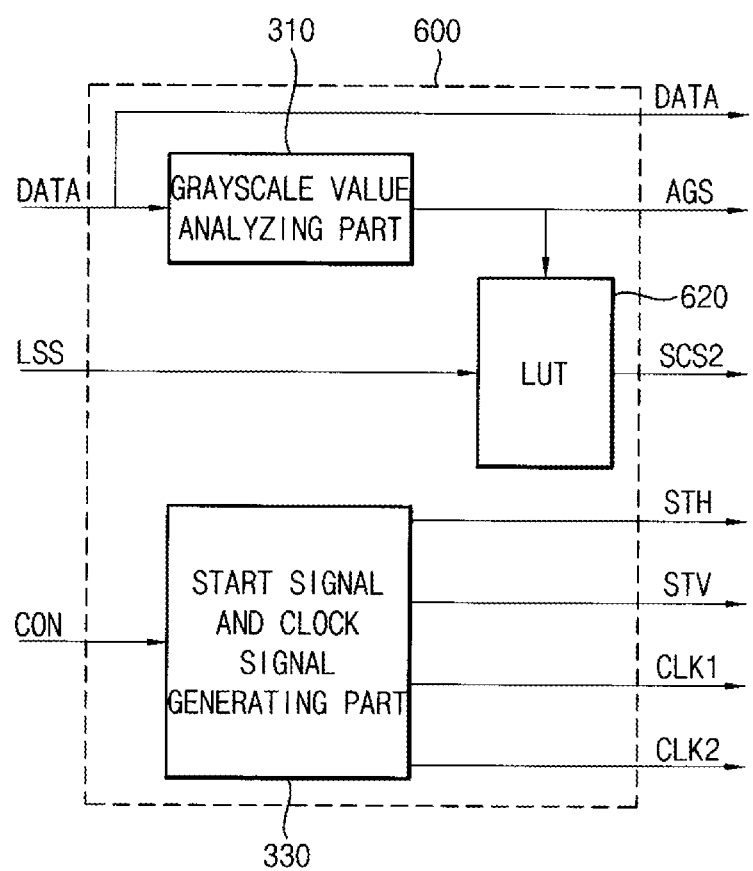
FIG. 11 is a block diagram illustrating the timing control part of FIG. 10.

FIG. 11 is a block diagram illustrating the timing control part 600 of FIG. 10.

Referring to FIGS. 10 and 11, the timing control part 600 includes the grayscale value analyzing part 310, the lookup table 620 and the start signal and clock signal generating part 330.

The grayscale value analyzing part 310 receives the image data DATA and analyzes the average grayscale value of the image data DATA to output the corresponding average grayscale value signal AGS for each frame or respective subunit of a frame (e.g., left and right images).

The lookup table 620 outputs the shutter glasses controlling signal SCS2 in response to the average grayscale value signal AGS outputted from the grayscale value analyzing part 310 and also in response to the illuminance sensing signal LSS outputted from the illuminance sensor part 520. The open time of the shutter glasses 210 according to the average grayscale value of the image data DATA and the illuminance around the shutter glasses 210 may be stored in the lookup table 620.

The start signal and clock signal generating part 330 receives the control signal CON and outputs the horizontal start signal STH, the vertical start signal STV, the first clock signal CLK1 and the second clock signal CLK2 using the control signal CON.

Figure 12:
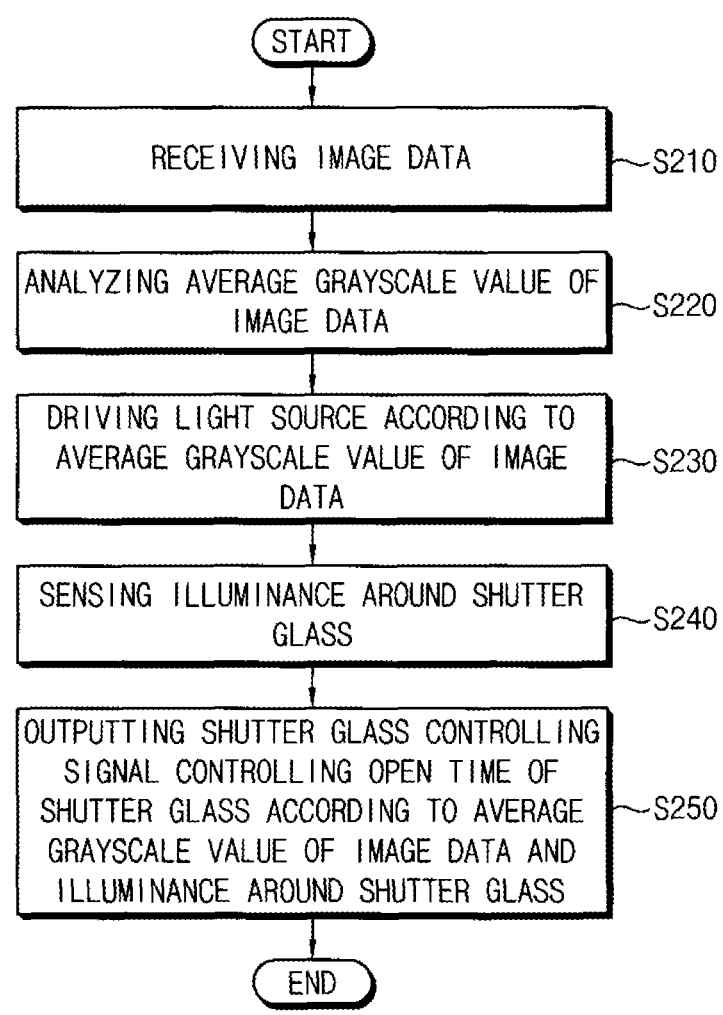
FIG. 12 is a flow chart illustrating a method of driving a shutter glasses performed by a shutter glasses apparatus of FIG. 10.

FIG. 12 is a flow chart illustrating a machine-implemented method of driving a shutter glasses as performed by the shutter glasses apparatus 500 of FIG. 10.

Referring to FIGS. 10 to 12, the timing control part 600 receives the image data DATA (step S210).

The grayscale value analyzing part 310 in timing control part 600 analyzes the average grayscale value of the image data DATA and outputs the average grayscale value signal AGS (step S120).

The light source driving part 220 outputs the light source driving signal LDS to the light source module 140 in response to the average grayscale value signal AGS (step S230). For example, the duty ratio of the light source driving signal LDS may be low as the average grayscale value of the image data DATA is low.

The illuminance sensor part 520 senses the ambient illuminance around the shutter glasses 210 and outputs the illuminance sensing signal LSS to the timing control part 600 (step S240).

The lookup table 620 outputs the shutter glasses controlling signal SCS2 controlling the open time of the shutter glasses 210 to the shutter glasses 210 in response to the average grayscale value signal AGS and in response to the illuminance sensing signal LSS (step S250).

Specifically, the timing control part 600 decreases a duty ratio of the shutter glasses controlling signal SCS2 to decrease the open time of the shutter glasses 210 as the average grayscale value of the image data DATA is low. In addition, the timing control part 600 decreases the duty ratio of the shutter glasses controlling signal SCS2 to decrease the open time of the shutter glasses 210 as the sensed illuminance around the shutter glasses 210 becomes higher. The open time of the shutter glasses 210 according to the average grayscale value of the image data DATA and the illuminance around the shutter glasses 210 may be stored in the lookup table 620.

According to the present teachings therefore, the open time of the shutter glasses 210 may be extended beyond the ON time of the light source 140 and the extended open time may be controlled according to the average grayscale value of the image data DATA where the extended open time of the shutter glasses 210 is used to change the amount of additional brightness around the shutter glasses 210 that is passed through the shutter glasses 210, and thus efficiency of the backlighting system 140 may be increased (because it does not to supply that additional amount of brightness) and a sense of realism may be enhanced (because, for example, the additional amount of brightness matches the ambient lighting that the user is immersed in). In addition, the open time of the shutter glasses 210 is controlled according to the illuminance around the shutter glasses 210 to change brightness around the shutter glasses 210 seen by the shutter glasses 210, and thus visibility of the image data DATA may be improved.

According to the disclosed and machine-implemented method of driving the shutter glasses, an open time of the shutter glasses is controlled according to an average grayscale value of an image data to thereby change an amount of additional brightness which is around the shutter glasses and is additionally let through the shutter glasses, and thus efficiency of the shutter glasses may be increased and a sense of realism may be enhanced.

In addition, the open time of the shutter glasses is controlled according to an illuminance sensed around the shutter glasses to change brightness around the shutter glasses seen by the shutter glasses, and thus visibility of the image data may be improved.

The foregoing is illustrative of the present disclosure of invention and is not to be construed as limiting thereof. Although a few example embodiments have been described, those skilled in the art will readily appreciate in light of the foregoing that many modifications are possible in the example embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A machine-implemented method of driving shutter glasses used in conjunction with a source-lit display device, the method comprising:
   determining an average grayscale value of a received image data signal representing a frame of an image that is to be perceived as being displayed by the source-lit display device; and
   controlling a shutter open time of the shutter glasses in accordance with the determined average grayscale value of the image data,
   wherein the average grayscale value is determined in a frame period, and
   wherein the shutter glasses including a left eye shutter part corresponding to a left eye of a user and a right eye shutter part corresponding to a right eye of the user, and
   wherein during the shutter open time of the shutter glasses, both of the left eye shutter part and the right eye shutter part are simultaneously opened.

2. The method of claim 1, wherein the shutter open time of the shutter glasses is controlled such that the shutter open time is extended after a light providing duration of a lighting source of the source-lit display device in cases where the determined average grayscale value indicates that the to-be-perceived image is to include a white level or an otherwise ambient lifted level of light, where the extended open time of the shutter glasses lets through a corresponding amount of ambient light.

3. The method of claim 2, further comprising:
   outputting a light source driving signal to the lighting source of the source-lit display device to thereby cause the lighting source to provide a corresponding amount of display illuminating light to which there can be added the amount of ambient light determined by the extension of the open time of the shutter glasses.

4. The method of claim 3, wherein the light source driving signal is a square wave signal having a respective duty ratio.

5. The method of claim 4, wherein a luminance provided by the lighting source is kept as a constant and an additional amount of ambient light is variably added thereto in accordance with the extension of the open time of the shutter glasses.

6. The method of claim 5, wherein a current of the light source driving signal is increased as the duty ratio of the light source driving signal is decreased, and the current of the light source driving signal is decreased as the duty ratio of the light source driving signal is increased.

7. The method of claim 3, wherein the open time of the shutter glasses is substantially equal to or greater than a turn on time of the lighting source.

8. The method of claim 7, wherein the open time of the shutter glasses is substantially equal to the turn on time of the lighting source when the determined average grayscale value of the image data is less than or equal to a predetermined minimum value.

9. The method of claim 3, wherein a driving period of the lighting source is substantially equal to an opening and closing period of the shutter glasses.

10. The method of claim 9, wherein the driving period of the lighting source and the open period of the shutter glasses are substantially equal to the frame period of the image data.

11. The method of claim 9, wherein the driving period of the lighting source and the open period of the shutter glasses are about ½ of the frame period of the image data.

12. The method of claim 1, wherein the image data includes two-dimensional plane image data.

13. The method of claim 1, further comprising:
    sensing an illuminance around the shutter glasses; and
    controlling the open time of the shutter glasses according to the sensed illuminance around the shutter glasses.

14. The method of claim 13, wherein the open time of the shutter glasses is decreased as the illuminance around the shutter glasses is sensed to be higher, and the open time of the shutter glasses is increased as the illuminance around the shutter glasses is sensed to be lower.

15. The method of claim 1, wherein the shutter open time of the shutter glasses is additionally determined by a setting choice made by a user of the shutter glasses.

16. A shutter glasses apparatus used in conjunction with a source-lit display device, the shutter glasses apparatus comprising:
    a set of shutter glasses including a left eye shutter part corresponding to a left eye of a user and a right eye shutter part corresponding to a right eye of the user; and
    a timing control part configured to automatically determine from a received images representing signal, an average grayscale value of a frame of each of plural images that are represented by the received images representing signal and that are to be perceived as being displayed by the source-lit display device, the timing control part being further configured to control opening times of the left and right eye shutter parts in accordance with the automatically determined average grayscale values of the corresponding images data,
    wherein the average grayscale value is determined in a frame period, and
    wherein during the opening times of the left and right eye shutter parts, both of the left eye shutter part and the right eye shutter part are simultaneously opened.

17. The shutter glasses apparatus of claim 16, wherein the opening time is decreased as the determined average grayscale value of the image data becomes lower, and the opening time is increased as the determined average grayscale value of the image data becomes higher.

18. The shutter glasses apparatus of claim 16 wherein a luminance of the lighting source is kept substantially constant.

19. A display apparatus comprising:
    a backlighted display panel configured for displaying a plurality of images in accordance with a received image data signal representing the images; and
    a shutter glasses apparatus comprising:
        a shutter glasses including a left eye shutter part corresponding to a left eye and a right eye shutter part corresponding to a right eye; and
        a timing control part configured to automatically determine from the received images representing signal, an average grayscale value of a frame of each of the plural images that are represented by the received images representing signal and that are to be perceived as being displayed by the backlighted display panel, the timing control part being further configured to control opening times of the left and right eye shutter parts in accordance with the automatically determined average grayscale values of the corresponding images data,
        wherein the average grayscale value is determined in a frame period, and
        wherein during the opening times of the left and right eye shutter parts, both of the left eye shutter part and the right eye shutter part are simultaneously opened.

20. The display apparatus of claim 19, wherein the opening time is decreased as the determined average grayscale value of the image data is low, and the opening time is increased as the determined average grayscale value of the image data is high.

21. The method of claim 2, wherein the extension of the open time is decreased when the determined average grayscale value of the image data becomes lower, and wherein the extension of the open time is increased when the determined average grayscale value of the image data becomes higher.

* * * * *